United States Patent [19]
Sokn

[11] Patent Number: 5,811,684
[45] Date of Patent: Sep. 22, 1998

[54] PRESSURE SENSOR PACKAGE AND METHOD OF MAKING THE SAME

[75] Inventor: Erick Lee Sokn, Janesville, Wis.

[73] Assignee: SSI Technologies, Inc., Janesville, Wis.

[21] Appl. No.: 728,661

[22] Filed: Oct. 10, 1996

Related U.S. Application Data

[63] Continuation-in-part of Ser. No. 628,376, Apr. 5, 1996.

[51] Int. Cl.$^6$ ............................... G01L 9/04; G01L 7/08
[52] U.S. Cl. ................... 73/706; 73/726; 29/511; 29/516
[58] Field of Search ............................. 73/723, 724, 725, 73/726, 727, 706; 29/511, 516, 520

[56] References Cited

U.S. PATENT DOCUMENTS

| | | | |
|---|---|---|---|
| 2,187,661 | 1/1940 | Lochrane | 29/520 |
| 3,322,890 | 5/1967 | Kennedy et al. | 174/152 |
| 3,398,333 | 8/1968 | Zeppieri | 317/230 |
| 3,897,131 | 7/1975 | Stauffer | 339/220 |
| 3,909,924 | 10/1975 | Vindasius et al. | 29/574 |
| 4,047,790 | 9/1977 | Carino | 339/220 |
| 4,148,408 | 4/1979 | Wolf | 220/200 |
| 4,379,279 | 4/1983 | Nasiri | 338/42 |
| 4,454,398 | 6/1984 | Aschenbach et al. | 200/302.3 |

(List continued on next page.)

FOREIGN PATENT DOCUMENTS

| | | | |
|---|---|---|---|
| 0 467 677 A2 | 7/1991 | European Pat. Off. | G01L 7/08 |
| 0 545 319 A2 | 11/1992 | European Pat. Off. | G01L 9/06 |
| 0 674 360 A1 | 9/1995 | European Pat. Off. | H01R 13/41 |
| 94 06 625.6 | 7/1994 | Germany | G01L 9/00 |
| A 44 10 455 | 6/1995 | Germany | H01R 13/405 |
| 195 07 143 A1 | 9/1995 | Germany | G01L 9/00 |
| 07209115 | 8/1995 | Japan | G01L 9/04 |
| 7-209115 | 8/1995 | Japan | G01L 9/04 |
| WO 94/04897 | 3/1994 | WIPO | G01L 7/08 |

OTHER PUBLICATIONS

*Siemens Aktiengesellschaft,* Temeperature and Pressure Sensor Data Book, (1990–1991); pp. 93–97.

Motorla Pressure Sensor Device Data; Motorola, Inc. 1990.

Eugene Svoboda, "Passive Compensation of a Monolithic Silicon Pressure Transducer", Sensym, Inc., 1986.

P.E.M. Frere, S.J. Prosser, "Temperature Compensation of Silicon Pressure Sensors For Automatic Applications", Lucas Research Centre, Lucas Engineering & Systems Ltd., U.K., pp. 270–274.

Yamada, et al., "A Piezoresistive Integrated Pressure Sensor", *Sensors and Actuators,* 4 (1983); pp. 63–69.

Xian–Ping Wu, et al., "An Intergrated Pressure Transducer For Biomedical Applications", *Sensors and Actuators,* 2 (1982); pp. 309–320.

Willig, "Operational Amplifiers", *EXAMplifications,* May/Jun. 1993; pp. 256–258.

(List continued on next page.)

*Primary Examiner*—Joseph L. Felber
*Attorney, Agent, or Firm*—MIchael Best & Friedrich LLP

[57] ABSTRACT

A method of securing a pressure sensor diaphragm to a pressure sensor base, including the steps of positioning the pressure sensor diaphragm over the pressure sensor base, placing a pressure sensor cap over the pressure sensor diaphragm, applying a tensile force to at least a portion of the cap, and deforming a portion of the cap around a portion of the base. The applying step can occur before the deforming step by engaging a portion of the cap and advancing the base toward the cap to create tension in a portion of the cap. This creates a tensile preload in the cap. The applying step can instead be performed during the deforming step by engaging a first portion of the cap and advancing a second portion of the cap toward the first portion of the cap and around a portion of the base. This can create tension in a portion of the cap when the deformation operation is being performed.

22 Claims, 3 Drawing Sheets

U.S. PATENT DOCUMENTS

| | | | |
|---|---|---|---|
| 4,525,022 | 6/1985 | Murray | 339/220 |
| 4,570,097 | 2/1986 | Shukla et al. | 310/338 |
| 4,655,088 | 4/1987 | Adams | 73/756 |
| 4,686,764 | 8/1987 | Adams et al. | 29/592 |
| 4,732,042 | 3/1988 | Adams | 73/706 |
| 4,774,863 | 10/1988 | Guckel et al. | 156/653 |
| 4,840,068 | 6/1989 | Mayhew | 73/706 X |
| 4,842,685 | 6/1989 | Adams | 156/308.2 |
| 4,853,669 | 8/1989 | Guckel et al. | 338/4 |
| 4,907,983 | 3/1990 | Wilson | 439/278 |
| 4,965,697 | 10/1990 | Mosser et al. | 338/36 |
| 4,996,082 | 2/1991 | Guckel et al. | 427/99 |
| 5,095,755 | 3/1992 | Peterson | 73/706 |
| 5,144,843 | 9/1992 | Tamura et al. | 73/727 |
| 5,184,107 | 2/1993 | Maurer | 338/42 |
| 5,212,989 | 5/1993 | Kodama et al. | 73/706 |
| 5,285,690 | 2/1994 | Koen et al. | 73/727 |
| 5,325,720 | 7/1994 | Zuckerwar et al. | 73/756 |
| 5,341,684 | 8/1994 | Adams et al. | 73/721 |

OTHER PUBLICATIONS

Poff, "Stable Miniature Pressure Transducer Using Inorganic Bonding Contstruction", Endevco Corporation, 1987; pp. 373–382.

Williams, "Good bridge–circuit design satisfies gain and balance criteria", EDN Designers' Guide to Bridge Circuits, Oct. 25, 1990; pp. 161–174.

Dresser Industries Brochure—Ashcroft "Model K1 Thin Film Pressure Transmitter".

Sensotec Brochure—"Subminiature Pressure Transducers", pp. 10–11.

Schultz, "Amplifiers for Semiconductor Pressure Sensors", Motorola Semiconductor Products, pp. 291–298.

Korane, "Silicon for High–Pressure Sensing", *Machine Design,* May 11, 1989; pp. 64–70.

Bicking, et al., "Sensors Packaging For High Volume Applications", IEEE 1985, pp. 350–351.

Kistler Measuring with Crystals; Kistler Instruments AG.

Industrial Pressure Transducer Model P27E Type, Trans-Metrics, Inc.

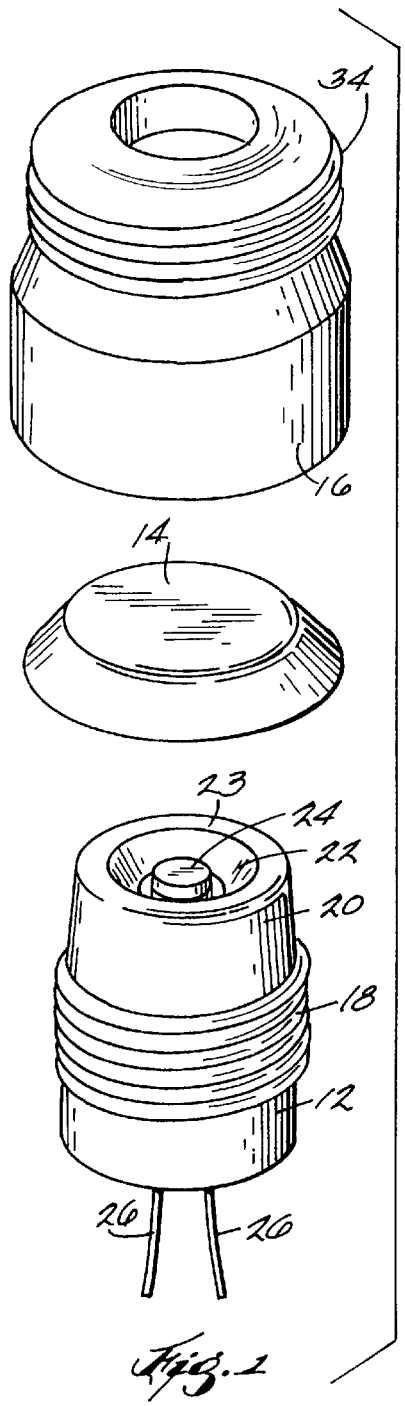
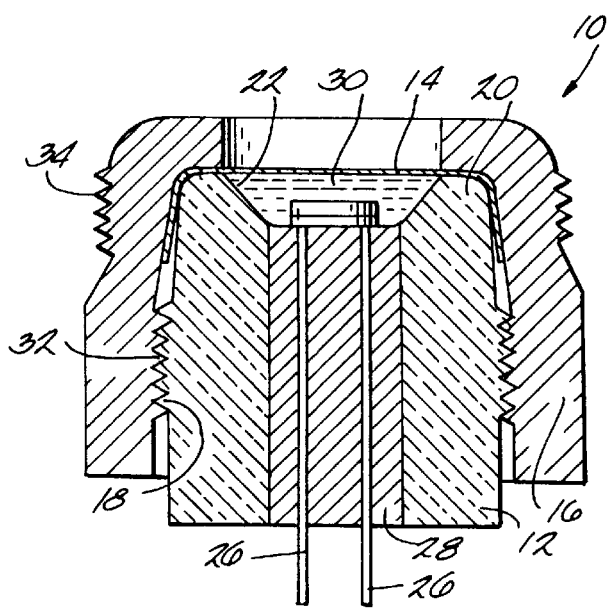
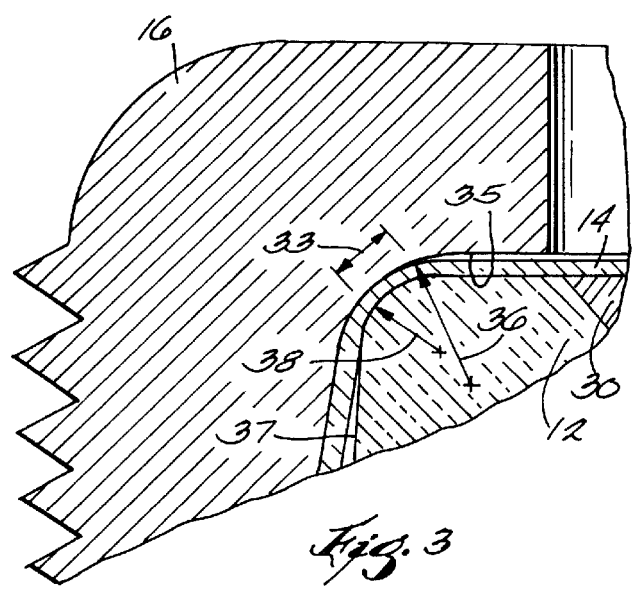

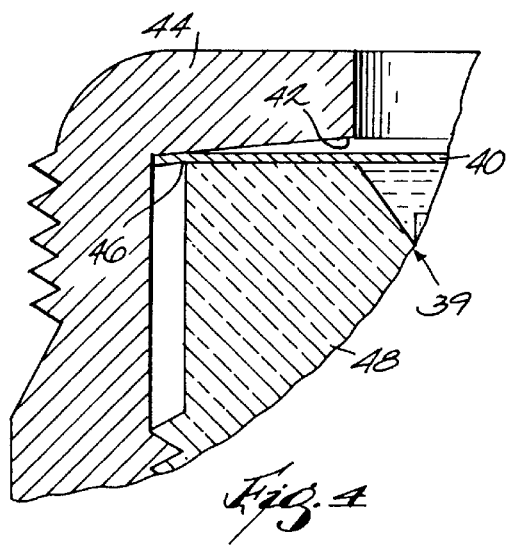
Fig. 4
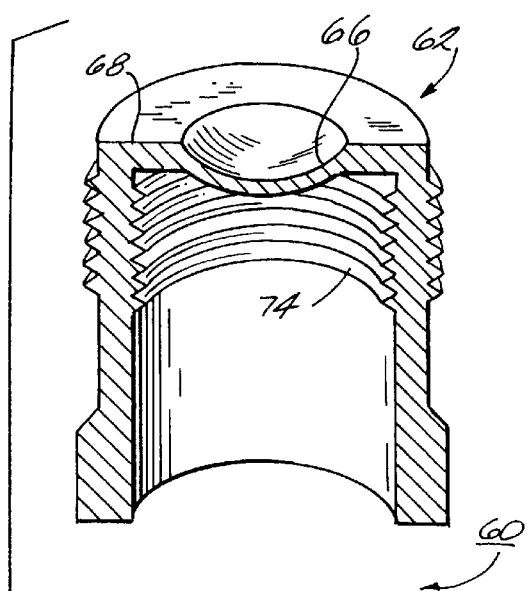
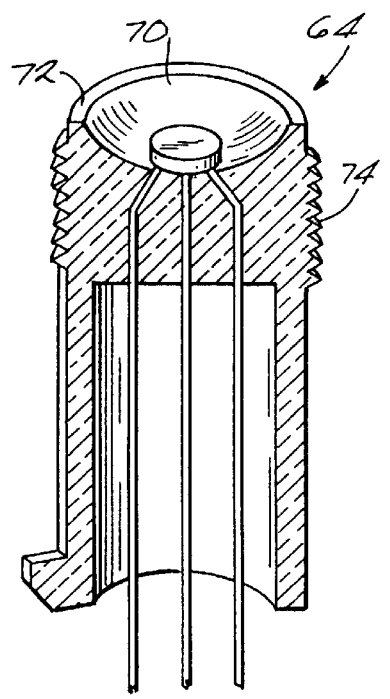
Fig. 6
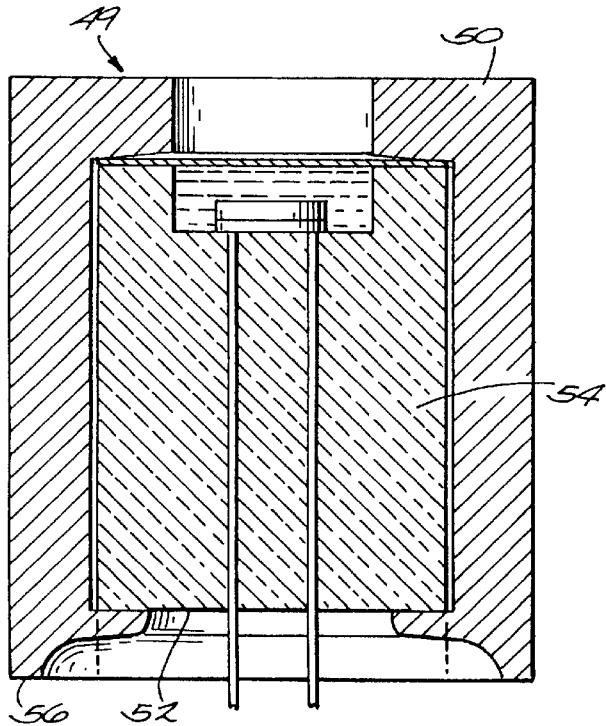
Fig. 5

PRESSURE SENSOR PACKAGE AND METHOD OF MAKING THE SAME

RELATED APPLICATIONS

This application is a continuation-in-part of U.S. patent application Ser. No. 08/628,376, filed Apr. 5. 1996.

FIELD OF THE INVENTION

The present invention generally relates to the field of pressure sensor packages, and more specifically to pressure sensor packages having a pressure chip sealed within a cavity by a diaphragm.

BACKGROUND OF THE INVENTION

Pressure sensors are used in a variety of areas, such as automotive and industrial applications, to provide an electrical signal corresponding with a measured fluid pressure. For example, pressure sensors can be used to measure automotive oil pressure and hydraulic fluid pressure.

One type of pressure sensor includes a solid state pressure sensing bridge, or chip, for generating an electrical signal corresponding with fluid pressure applied to the chip. Typically, the chip is mounted within a cavity of a base, and a fluid medium (e.g., silicone gel) is placed within the cavity to cover the chip. A diaphragm is secured to the base over the cavity to secure the gel within the cavity, and to create a sealed pressure sensor package. Alternatively, the gel can be injected into the cavity through a separate port after the diaphragm is secured to the base. In operation, pressure applied to the diaphragm deflects the diaphragm, is transmitted by the medium, thereby resulting in pressurization of the chip.

The diaphragm is commonly secured to the base by welding. Welding provides an adequate seal, but the operation can only be performed if both the base and the diaphragm are made of compatible metallic materials. In addition, the welding operation can be expensive, and can cause heat distortion of the components. Also, the welding typically must be done without the fluid medium in the cavity, thereby requiring the extra operations of injecting the fluid medium into the cavity and thereafter sealing the cavity without causing an unacceptable pressure offset pressure in the cavity.

SUMMARY OF THE INVENTION

In one aspect, the present invention provides a method of securing a pressure sensor diaphragm to a pressure sensor base. The method includes the steps of positioning the pressure sensor diaphragm over the pressure sensor base, placing a pressure sensor cap over the pressure sensor diaphragm, applying a tensile force to at least a portion of the cap, and deforming a portion of the cap around a portion of the base. The applying step can occur before the deforming step by engaging a portion of the cap and advancing the base toward the cap to create tension in a portion of the cap. This creates a tensile preload in the cap. The applying step can instead be performed during the deforming step by engaging a first portion of the cap and advancing a second portion of the cap toward the first portion of the cap and around a portion of the base. This can create tension in a portion of the cap when the deformation operation is being performed.

The engaging step preferably includes the step of engaging a portion of the cap that is spaced from the diaphragm. For example, the engaging step can include the step of engaging a portion of the cap that is closer to the deformed portion of the cap than to the diaphragm. The method can further include the steps of moving the pressure sensor cap toward the pressure sensor base, and deforming a portion of the pressure sensor diaphragm between the pressure sensor cap and the pressure sensor base. For example, the step of deforming can include the step of deforming the pressure sensor diaphragm along a line of deformation.

In another aspect, the present invention provides a pressure sensor package including a pressure sensor base having a cavity, a pressure sensor diaphragm positioned over the cavity, and a pressure sensor cap positioned over and secured to the pressure sensor base. The pressure sensor cap includes a deformed portion that secures the cap to the base, an engaging portion adapted to allow engagement of the cap when the deformed portion is being deformed around the base, an upper portion between the engaging portion and the diaphragm, and a lower portion between the engaging portion and the deformed portion, wherein the upper portion is longer than the lower portion. In one embodiment, the engaging portion extends radially outwardly from the cap, such as in the form of an annular ledge.

The pressure sensor diaphragm preferably is formed separately from the cap, but could also be formed integral therewith. In this regard, a portion of the pressure sensor diaphragm can be deformed between the pressure sensor cap and the pressure sensor base, such as along a line of deformation.

BRIEF DESCRIPTION OF THE DRAWINGS

FIG. 1 is a perspective exploded view of a pressure sensor package embodying the present invention.

FIG. 2 is a section view of the package illustrated in FIG. 1 after assembly.

FIG. 3 is an enlarged view of a portion of the package illustrated in FIG. 2

FIG. 4 is a partial section view of a second embodiment of the present invention.

FIG. 5 is a partial section view of a third embodiment of the present invention.

FIG. 6 is a perspective view of a fourth embodiment of the present invention.

FIG. 7 is a section view of a fifth embodiment of the present invention before the cap is deformed around the base.

DETAILED DESCRIPTION

Figure 8:
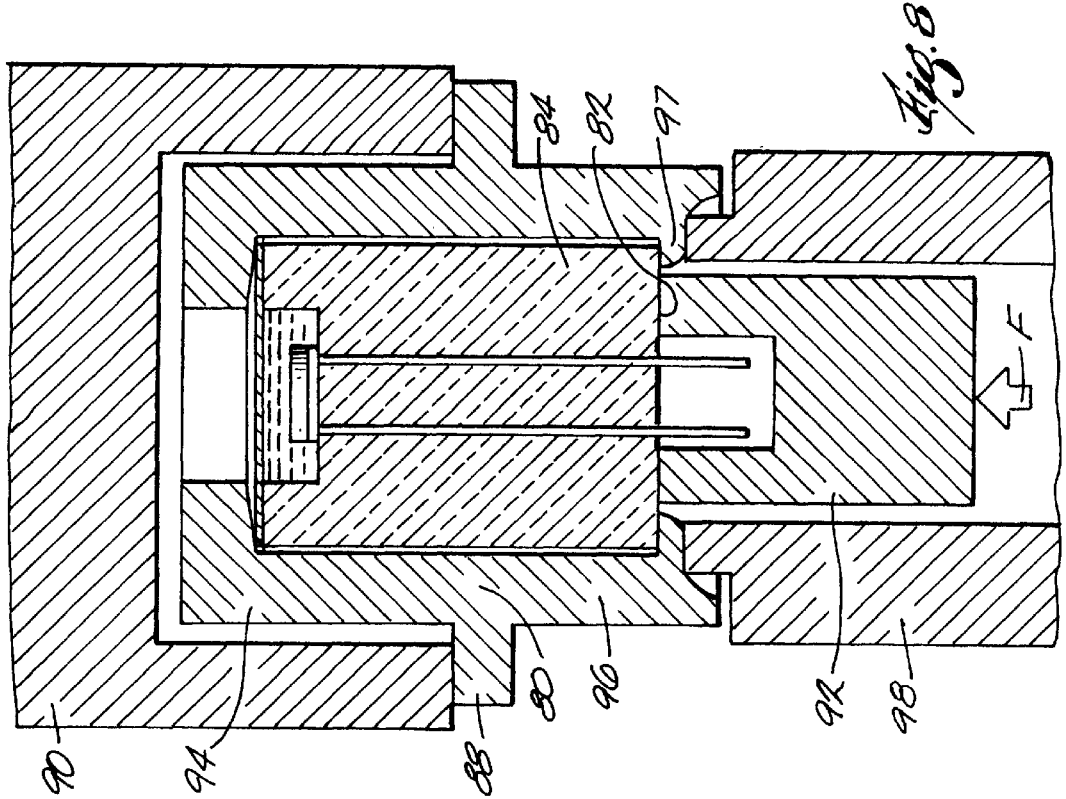
FIG. 8 is a section view of the package of FIG. 7 after the cap is deformed around the base.
Figure 9:
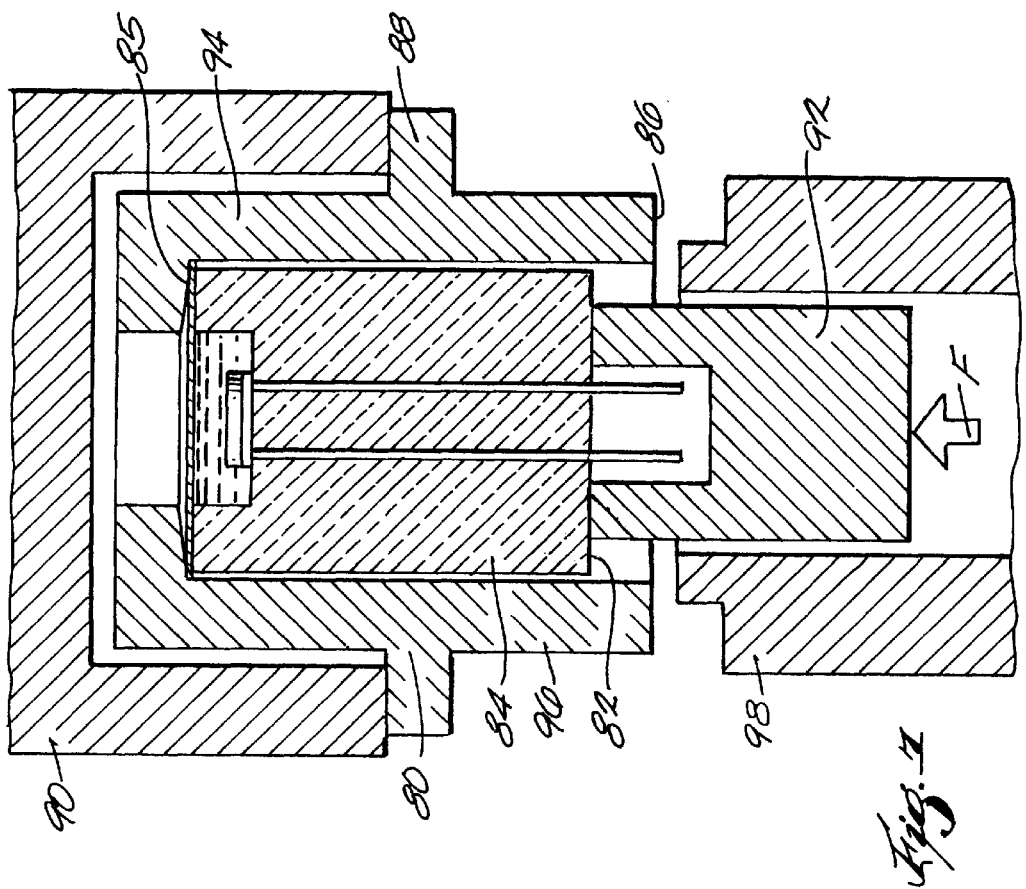

FIGS. 1–3 illustrate a pressure sensor package 10 embodying the present invention. The package 10 includes a pressure sensor base 12, a pressure sensor diaphragm 14, and a pressure sensor cap 16 positioned over the diaphragm 14 and secured to the base 12. The base 12 includes external threads 18 for securing the cap 16 to the base 12. The base 12 further includes a cylindrical sidewall 20 defining a cavity 22 and an upper, annular surface 23. The package 10 also includes a pressure sensing chip 24 which is positioned within the cavity 22. A plurality of wires 26 operatively inter-connect with the chip 24 and extend out the bottom of the base 12.

The base 12 is preferably made from a metallic material, such as stainless steel or cold rolled steel. The pressure sensing chip 24 can be any appropriate chip for sensing fluid pressure, and the selection of which will depend in part on the pressures to be sensed. For example, the pressure sensing chip 24 can be any of a variety of pressure transducers, such as those described in U.S. Pat. No. 5,507,171, U.S. Pat. No. 4,744,863, U.S. Pat. No. 4,853,669 and U.S. Pat. No. 4,996,082, all of which are incorporated herein by reference. The wires 26 are sealed within the base 12 by an appropriate sealing material 28, such as glass, in a conventional manner.

The diaphragm 14 overlies the cavity 22 to provide a barrier to the entry of contaminants into the cavity 22. The diaphragm 14 is not welded to the base 12 as with prior art designs, but rather is held in place by the cap 16, as described below in more detail. Because the diaphragm 14 is not welded to the base 12, the diaphragm 14 can be made from non-metallic materials, such as elastomers, rubbers and plastics, and may also be made of metallic materials, such as stainless steel or plated cold rolled steel. In the illustrated embodiment, the diaphragm 14 is made of stainless steel.

The package 10 also includes (FIG. 2) a quantity of pressure transfer media 30 which substantially fills the cavity 22 and covers the chip 24. The pressure transfer media 30 occupies the cavity 22 between the diaphragm 14 and the chip 24 so that little or no air is within the cavity 22. The pressure transfer media 30 transfers pressures caused by deflection of the diaphragm 14 (caused, for example, by a change in pressure applied to the diaphragm) to the chip 24. In this regard, it is typically desirable to choose the pressure transfer media 30 to be a virtually incompressible material, such as is the case with many liquids and gels. In the illustrated embodiment, the pressure transfer media 30 is silicone gel.

The cap 16 includes internal threads 32 for securing the cap 16 to the base 12, and external threads 34 for securing the package 10 into a threaded port (not shown) for sensing fluid pressure within the port. The cap 16 is positioned over the diaphragm 14 to hold the diaphragm 14 in place and to provide a seal to prevent entry of foreign materials into the cavity 22. The seal is accomplished by providing an interface between the cap 16 and the base 12 such that the diaphragm 14 is contacted along a line of deformation in FIG. 3 by the zone identified by reference number 33. Such contact results in deformation of the diaphragm 14 when the cap 16 is threaded onto the base 12. This line contact is particularly important when the diaphragm 14 is made from a metallic material in order to concentrate the clamping force of the cap 16 to a narrowly defined localized area, thereby promoting deformation, and preferably plastic deformation, of the diaphragm 14. In this regard, because the illustrated diaphragm is made from stainless steel, the illustrated cap is also made from a metallic material, such as stainless steel.

Contact along a line or localized zone of deformation is facilitated by (FIG. 3) contacting the diaphragm 14 between an inner surface 35 of the cap 16 and an outer surface 37 of the base 12 such that the inner surface 35 and the outer surface 37 diverge from each other when moving away from the line of deformation. In the illustrated embodiment, such contact is achieved by contacting the diaphragm 14 between a concave inner radius 36 of the cap 16 and a convex outer radius 38 of the base 12, with the inner radius 36 being larger than the outer radius 38, as shown in FIG. 3.

FIG. 4 illustrates a pressure sensor assembly 39 which is similar to the package 10 and which is an alternative embodiment of the present invention. In the assembly 39, a diaphragm 40 optionally extends radially beyond the base 48 is compressed between a sloped surface 42 of a cap 44 and a sharp corner or higher radius 46 of a base 48. The illustrated arrangement provides a line of contact between the cap 44 and the base 48 so that the force therebetween is concentrated, and the outer periphery of the diaphragm 40 beyond the base 48 is deflected by the sloped surface 42. Such concentration of the force results in deformation, and preferably plastic deformation, of the diaphragm 40.

Rather than utilizing a threaded interface for securing and compressing the cap relative to the base, other arrangements could be used. For example, FIG. 5 illustrates an assembly 49 which is similar to assemblies 10 and 39 and which is an alternative embodiment wherein a cap 50 extends beyond the bottom 52 of a base 54. In this embodiment, the bottom 56 of the cap 50 is plastically deformed around the bottom 52 of the base 54, or an appropriate ledge or groove (not shown) formed in the base 54. In such an arrangement, there is no need to provide threads on the base or internal threads on the cap. Rather, the cap 50 is secured to the base 54 by a simple plastic deformation, or coining, of the cap 50 around the base 54.

Assembly of the above-described pressure sensor packages can be performed by filling the cavity 22 with fluid, positioning the diaphragm over the base, placing the cap over the diaphragm, and moving the cap toward the base until the diaphragm is deformed therebetween. In the package illustrated in FIGS. 1–3, the step of moving includes the steps of engaging threads 32 on the cap 16 with threads 18 on the base 12, and rotating the cap 16 relative to the base 12. The respective diaphragms of the alternative embodiments shown in FIGS. 1–5 are deformed along lines of deformation that form a closed path adjacent a periphery of the pressure sensor diaphragm. Such closed path forms the desired barrier to the entry of contaminants into the cavity 22. For the package 49 illustrated in FIG. 5, the method further includes the step of deforming a portion of the cap 50 around a portion of the base 54 to thereby fix the cap 50 in position relative to the base 54.

FIG. 6 illustrates a pressure sensor package 60 that is a further alternative embodiment of the invention and that eliminates a leak path between the cap and the base. More specifically, the above-described and illustrated packages 10, 39 and 49 (FIGS. 1–5) generally have potential leak paths between the respective cap and the diaphragm and between the cap and the base. In contrast, the package 60 illustrated in FIG. 6 has only a leak path between the cap 62 and the base 64. This is accomplished by forming the cap 62 from a single piece of material to provide a central diaphragm portion 66 and an integral, peripheral cap portion 68 which is thicker than the diaphragm portion 66. For example, the cap portion 68 and the diaphragm portion 66 could be molded as a unitary structure. The side of the diaphragm portion 66 facing the cavity 70 is optionally arcuately convex such that the diaphragm portion 66 extends below the upper surface 72 of the base 64. Such a design facilitates movement of any air pockets out of the cavity 70 as the cap 62 is being secured to the base 64. That is, when the cap 62 is moved toward the base 64, the center of the diaphragm portion 66 will contact the fluid in the cavity 70 before any other part of the diaphragm portion 66. Further movement of the cap 62 toward the base 64 will result in the fluid contact point gradually moving radially outwardly on the diaphragm portion 66, thereby forcing air pockets to the outer perimeter of the cavity 70 and eventually out through the threads 74. The amount of fluid placed in the cavity 70 before assembly is only slightly more than the amount required for the final assembled package 60. The excess fluid will be allowed to leak out into the threads 74.

A fifth embodiment of the present invention is illustrated in FIGS. 7 and 8. The illustrated package is very similar to the package illustrated in FIG. 5 in that it includes a cap 80 that extends beyond a bottom 82 of a base 84. A diaphragm 85 is compressed between the cap 80 and the base 84. In addition, just like the FIG. 5 embodiment, a bottom 86 of the cap 80 is plastically deformed around the bottom 82 of the base 84 or, alternatively, an appropriate ledge or groove (not shown) formed in the base 84. In this arrangement, there is no need to provide threads on the base or internal threads on the cap 80. Rather, the cap 80 is secured to the base 84 by a simple plastic deformation, or coining, of the cap 80 around the base 84.

When the FIG. 5 embodiment is assembled, a punch deforms the cap and the sidewalls of the cap are put under compression. After the cap is deformed around the base, the punch is withdrawn, and the sidewall will typically spring back due to elastic deformation. Such springback can result in a loose fit between the cap and the base. In order to accommodate the springback, an over-pressure stroke is commonly used. However, there is a maximum cap length for which an over-pressure stroke will compensate for the springback.

To alleviate the need for an over-pressure stroke, the FIG. 7 embodiment includes an engaging portion along the outer surface of the cap 80 to allow the cap 80 to be supported during the deforming operation. In the illustrated embodiment, the engaging portion comprises an annular ledge 88. The annular ledge 88 is engaged by an upper punch 90 and the base 84 is engaged by an inner support 92 during the deforming operation. The inner support 92 is biased upwardly toward the upper punch 90 by a compliant biasing force F to create a tensile elastic preload in an upper portion 94 of the cap 80, while no preload is formed in a lower portion 96 of the cap 80. The upper portion 94 of the cap 80 is between the annular support 88 and a diaphragm 85, and the lower portion 96 is between the annular support 88 and an annular deformed portion 97 of the cap 80.

The pressure sensor package of FIGS. 7 and 8 is assembled by positioning the pressure sensor diaphragm over the pressure sensor base, and placing the pressure sensor cap over the pressure sensor diaphragm. A tensile force is then applied to at least a portion of the cap, and a portion of the cap is deformed around a portion of the base. In the illustrated embodiment, the deformation operation is performed by advancing the upper punch 90 toward a lower punch 98. Such movement of the package is accommodated by the compliant nature of the biasing force F that supports the inner support 92. As the upper punch 90 continues its travel downward, the lower punch 98 will eventually engage the bottom 86 of the cap 80, and subsequently deform the bottom 86 of the cap 80 around the bottom 82 of the base 84 to create the deformed portion 97 (FIG. 8). The deformed portion 97 secures the base 84 within the upper portion 94. During such deformation of bottom 86, additional tension is created in the upper portion 94 of the cap 80, and compression in created in the base 84.

Once the deformation is complete and the upper punch 90 is retracted, the base 84 will try to elastically expand slightly due to the removed compressive forces, and the upper portion 94 of the cap 80 will elastically contract slightly due to the removed tensile forces. This expansion of the base 84 and contraction of the cap 80 work against each other, resulting in very little springback of the cap 80 and a corresponding secure engagement between the cap 80 and the base 84.

It is noted that the lower portion 96 of the cap 80 is under compression during the deformation process. However, because the upper portion 94 is longer than the lower portion 96 and because the upper portion 94 is preloaded, any expanding springback of the lower portion 96 is taken up by contracting of the upper portion 94. In this regard, the relative amount of springback between the upper portion 94 and the lower portion 96 can be adjusted by adjusting the location of the annular ledge 88. More specifically, the closer the annular ledge 88 is to the bottom 86 of the cap 80, the more the upper portion 94 will contract after the deformation operation and, in general, the more tightly the base 84 will be held within the cap 80. If, on the other hand, the annular ledge 88 is located away from the bottom 86 of the cap 80 so that the lower portion 96 is longer than the upper portion 94, the compression of the lower portion 96 may be too much for the upper portion 94 to handle. Depending on the amount of preload applied to the upper portion 94, the result may be a poor engagement between the cap 80 and the base 84. In general, it is believed that it is advisable to located the annular ledge 88 below the middle of the cap 80 so that the upper portion 94 is longer than the lower portion 96.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. For example, the materials used for the base, the diaphragm and the cap could vary from those described, depending on design constraints such as temperature, pressure and environmental issues. In addition, instead of a ledge, the engaging portion could be any appropriate configuration, such as a recess, thread or spline. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of securing a pressure sensor diaphragm to a pressure sensor base comprising the steps of:

positioning the pressure sensor diaphragm over the pressure sensor base;

placing a pressure sensor cap over the pressure sensor diaphragm;

applying a tensile force to at least a portion of the cap; and deforming a portion of the cap around a portion of the base after said step of applying a tensile force to at least a portion of the cap.

2. A method as claimed in claim 1, wherein said applying step comprises the steps of:

engaging a portion of the cap; and advancing the base toward the cap to create tension in a portion of the cap.

3. A method as claimed in claim 2, wherein said engaging step includes the step of engaging a portion of the cap that is spaced from the diaphragm.

4. A method as claimed in claim 3, wherein the cap is deformed at a deformed portion of the cap, and wherein said engaging step includes the step of engaging a portion of the cap that is closer to the deformed portion than to the diaphragm.

5. A method as claimed in claim 1, wherein said applying and deforming steps include the steps of:

engaging a first portion of the cap; and advancing a second portion of the cap toward the first portion of the cap and around a portion of the base.

6. A method as claimed in claim 5, wherein said engaging step includes the step of engaging a portion of the cap that is spaced from the diaphragm.

7. A method as claimed in claim 6, wherein the cap is deformed at a deformed portion of the cap, and wherein said engaging step includes the step of engaging a portion of the cap that is closer to the deformed portion than to the diaphragm.

8. A method as claimed in claim 1, further comprising the steps of:

moving the pressure sensor cap toward the pressure sensor base; and deforming a portion of the pressure sensor diaphragm between the pressure sensor cap and the pressure sensor base.

9. A method as claimed in claim 8, wherein said step of deforming comprises the step of deforming the pressure sensor diaphragm along a line of deformation.

10. A method as claimed in claim 1, further comprising the step of applying a compression force to the pressure sensor base before said step of deforming a portion of the cap around a portion of the base.

11. A method of securing a pressure sensor diaphragm to a pressure sensor base, the method comprising:

positioning the pressure sensor diaphragm over the pressure sensor base;

placing a pressure sensor cap over the pressure sensor diaphragm;

applying a tensile force to at least a portion of the cap;

deforming a portion of the cap around a portion of the base; and removing said tensile force to allow elastic expansion of a portion of said cap.

12. A method as claimed in claim 11, wherein said applying step occurs before said deforming step.

13. A method as claimed in claim 12, wherein said applying step comprises the steps of:

engaging a portion of the cap; and advancing the base toward the cap to create tension in a portion of the cap.

14. A method as claimed in claim 13, wherein said engaging step includes the step of engaging a portion of the cap that is spaced from the diaphragm.

15. A method as claimed in claim 14, wherein the cap is deformed at a deformed portion of the cap, and wherein said engaging step includes the step of engaging a portion of the cap that is closer to the deformed portion than to the diaphragm.

16. A method as claimed in claim 11, wherein said applying step occurs during said deforming step.

17. A method as claimed in claim 16, wherein said applying and deforming steps include the steps of:

engaging a first portion of the cap; and advancing a second portion of the cap toward the first portion of the cap and around a portion of the base.

18. A method as claimed in claim 17, wherein said engaging step includes the step of engaging a portion of the cap that is spaced from the diaphragm.

19. A method as claimed in claim 18, wherein the cap is deformed at a deformed portion of the cap, and wherein said engaging step includes the step of engaging a portion of the cap that is closer to the deformed portion than to the diaphragm.

20. A method as claimed in claim 11, further comprising the steps of:

moving the pressure sensor cap toward the pressure sensor base; and compressing a portion of the pressure sensor diaphragm between the pressure sensor cap and the pressure sensor base.

21. A method as claimed in claim 20, wherein said step of compressing comprises the step of compressing the pressure sensor diaphragm along a line of compression.

22. A method as claimed in claim 11, further comprising the step of applying a compression force to the pressure sensor base before said step of deforming a portion of the cap around a portion of the base.

* * * * *